(12) United States Patent
Lee (10) Patent No.: US 8,651,249 B2
(45) Date of Patent: Feb. 18, 2014

(54) DISC ROTOR ASSEMBLY FOR VEHICLE

(75) Inventor: Chel Won Lee, Wanju-gun (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/307,823

(22) Filed: Nov. 30, 2011

(65) Prior Publication Data

US 2012/0312646 A1    Dec. 13, 2012

(30) Foreign Application Priority Data

Jun. 10, 2011    (KR) .......................... 10-2011-0056497

(51) Int. Cl.
*F16D 65/12*    (2006.01)
(52) U.S. Cl.
USPC ................................... 188/218 XL; 188/18 A
(58) Field of Classification Search
USPC ................ 188/218 XL, 18 A, 17, 18 R, 71.6; 301/6.1, 6.3, 6.8, 105.1
See application file for complete search history.

(56) References Cited

U.S. PATENT DOCUMENTS

| | | | |
|---|---|---|---|
| 6,446,765 B1 | 9/2002 | Dabertrand et al. | |
| 6,910,556 B1 * | 6/2005 | Baumgartner et al. | . 188/218 XL |
| 7,654,365 B2 * | 2/2010 | Lamb | ........................ 188/18 A |
| 8,061,785 B2 * | 11/2011 | Ilg | .............................. 301/105.1 |
| 8,342,298 B2 * | 1/2013 | Ilg et al. | .................. 188/218 XL |
| 2003/0006104 A1 | 1/2003 | Baumgartner et al. | |
| 2003/0111303 A1 * | 6/2003 | Wirtanen | ........................ 188/17 |

FOREIGN PATENT DOCUMENTS

| | | |
|---|---|---|
| JP | 2002-5207 A | 1/2002 |
| JP | 2006-37993 A | 2/2006 |
| JP | 2007-211961 A | 8/2007 |

\* cited by examiner

*Primary Examiner* — Pamela Rodriguez
(74) *Attorney, Agent, or Firm* — Morgan, Lewis & Bockius LLP (57) ABSTRACT

A disk rotor assembly for a vehicle may include an adaptor adapted to be mounted on a hub and to receive torque of a wheel, a disk rotor generating a braking force, a transmitter engaging the adaptor with the disk rotor and adapted to transmit the torque received by the adaptor to the disk rotor or to transmit the braking force generated by the disk rotor to the adaptor, and engaging member for engaging the adaptor, the disk rotor, and the transmitter altogether.

12 Claims, 8 Drawing Sheets

DISC ROTOR ASSEMBLY FOR VEHICLE

CROSS-REFERENCE TO RELATED APPLICATION

The present application claims priority to Korean Patent Application No. 10-2011-0056497 filed in the Korean Intellectual Property Office on Jun. 10, 2011, the entire contents of which is incorporated herein for all purposes by this reference.

BACKGROUND OF THE INVENTION

1. Field of the Invention

The present invention relates to a disk rotor assembly for a vehicle. More particularly, the present invention relates to a disk rotor assembly for a vehicle that prevents heat crack of a disk rotor by braking heat.

2. Description of Related Art

Generally, a braking apparatus of a vehicle converts kinetic energy into heat energy by friction so as to lower the vehicle's speed. The braking device is classified into a drum brake and a disk brake according to a shape of a rotating member rotating with a wheel and braking method.

Meanwhile, the disk brake includes an adaptor, a disk rotor, and a brake pad. The adaptor is mounted on a hub and receives torque of a wheel. The disk rotor rotates together with the adaptor and is made from cast iron. The disk brake brakes the vehicle by applying pressure to both side surfaces of the disk rotor by the brake pad.

Compared with the drum brake, the disk brake should generate a sufficient braking force by friction of a smaller area. Therefore, materials that can bear high load and high temperature are used for constituent elements of the disk brake.

However, a temperature of the disk rotor is raised higher than 400° C. by friction between the brake pad and the disk rotor, and heat deformation of the disk rotor may occur in this case.

Since a conventional disk brake where the adaptor and the disk rotor are integrally formed is thermally deformed in a state that the disk rotor is restricted by the adaptor, heat crack may occur at the disk rotor.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a disk rotor assembly for a vehicle having advantages of preventing heat crack by heat deformation of a disk rotor as a consequence of separating a disk rotor from a adaptor.

In addition, various aspects of the present invention are directed to provide a disk rotor assembly for a vehicle having further advantages of increasing marketability by improving durability of an adaptor and a disk rotor.

In an aspect of the present invention, a disk rotor assembly for a vehicle may include an adaptor adapted to be mounted on a hub and to receive torque of a wheel, a disk rotor generating a braking force, a transmitter engaging the adaptor with the disk rotor and adapted to transmit the torque received by the adaptor to the disk rotor or to transmit the braking force generated by the disk rotor to the adaptor, and engaging member for engaging the adaptor, the disk rotor, and the transmitter altogether.

The adaptor has a plurality of transmitter mounting surfaces contacting with a side surface of the transmitter, and a plurality of rotor contacting surfaces contacting with the disk rotor, and wherein the disk rotor has a plurality of transmitter mounting grooves at which the transmitter mounting surfaces of the adaptor are disposed therein to mount the transmitter, and a plurality of adaptor contacting surfaces contacting with the rotor contacting surfaces of the adaptor.

The transmitter penetrates the transmitter mounting groove and the side surface of the transmitter is engaged with the transmitter mounting surface, wherein a penetration hole through which the engaging member penetrates is formed at the transmitter, and an engaging hole for engaging with the engaging member is formed at the transmitter mounting surface.

The plurality of transmitter mounting surfaces is formed at an exterior circumference of the adaptor along a circumferential direction, and the rotor contacting surface is formed between the neighboring transmitter mounting surfaces.

The transmitter mounting surface may have a concave shape in an axial direction and open in the axial direction and a radial direction of the adaptor, wherein an exterior circumference of the transmitter mounting surface is shorter than an interior circumference thereof.

The transmitter mounting groove and the adaptor contacting surface are formed at an interior circumference of the disk rotor, wherein the plurality of transmitter mounting grooves is formed at the interior circumference of the disk rotor along a circumferential direction, and the adaptor contacting surface is formed between the neighboring transmitter mounting grooves.

The rotor contacting surface and the adaptor contacting surface contact with each other in a case that the adaptor and the disk rotor are engaged.

A bracket is formed at the transmitter so as to engage the adaptor with the adaptor contacting surface of the disk rotor and to prevent disengagement of the disk rotor.

The adaptor and the transmitter are directly engaged with each other by the engaging member, and the disk rotor is engaged to the adaptor by engagement of the adaptor and the transmitter, wherein a bracket is formed at the transmitter so as to engage the adaptor with the disk rotor and to prevent disengagement of the disk rotor.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
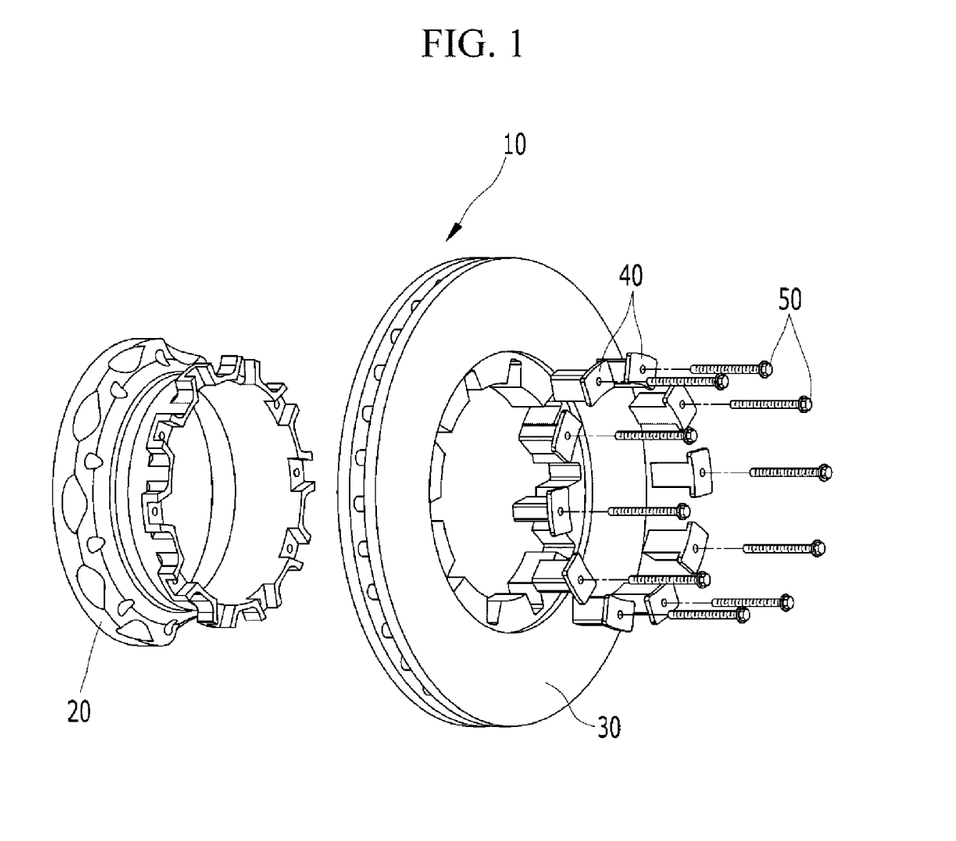
FIG. 1 is an exploded view of a disk rotor assembly for a vehicle according to an exemplary embodiment of the present invention.

FIG. 1 is an exploded view of a disk rotor assembly for a vehicle according to an exemplary embodiment of the present invention.

As shown in FIG. 1, a disk rotor assembly 10 for a vehicle according to an exemplary embodiment of the present invention includes an adaptor 20, a disk rotor 30, a transmitter 40, and engaging member 50.

The adaptor 20 is mounted on a hub of a wheel, transmits torque of the wheel to the disk rotor 30, and transmits braking force of a disk brake from the disk rotor 30 to the wheel.

The disk rotor 30 rubs with a brake pad of the disk brake and brakes a vehicle. The disk rotor 30 has a disk shape. If the brake pad applies pressure to both side surfaces of the disk rotor 30, kinetic energy of the vehicle is converted into heat energy by friction between the brake pad and the disk rotor 30. Therefore, the kinetic energy of the vehicle is reduced and braking of the vehicle is performed. Herein, frictional force between the brake pad and the disk rotor 30 is braking force of the disk brake.

The transmitter 40 facilitates and assists assembling of the disk rotor assembly 10 according to an exemplary embodiment of the present invention.

The transmitter 40 connects the adaptor 20 with the disk rotor 30. In addition, the transmitter 40 delivers torque of the adaptor 20 to the disk rotor 30 or delivers braking force of the disk rotor 30 to the adaptor 20.

The engaging member 50 engages the adaptor 20, the transmitter 40, and the disk rotor 30. Herein, the adaptor 20 and the transmitter 40 are directly engaged by the engaging member 50, and the disk rotor 30 is indirectly engaged with the adapter through engagement of the adaptor 20 and the transmitter 40. Thereby, the disk rotor assembly 10 is assembled.

Figure 2:
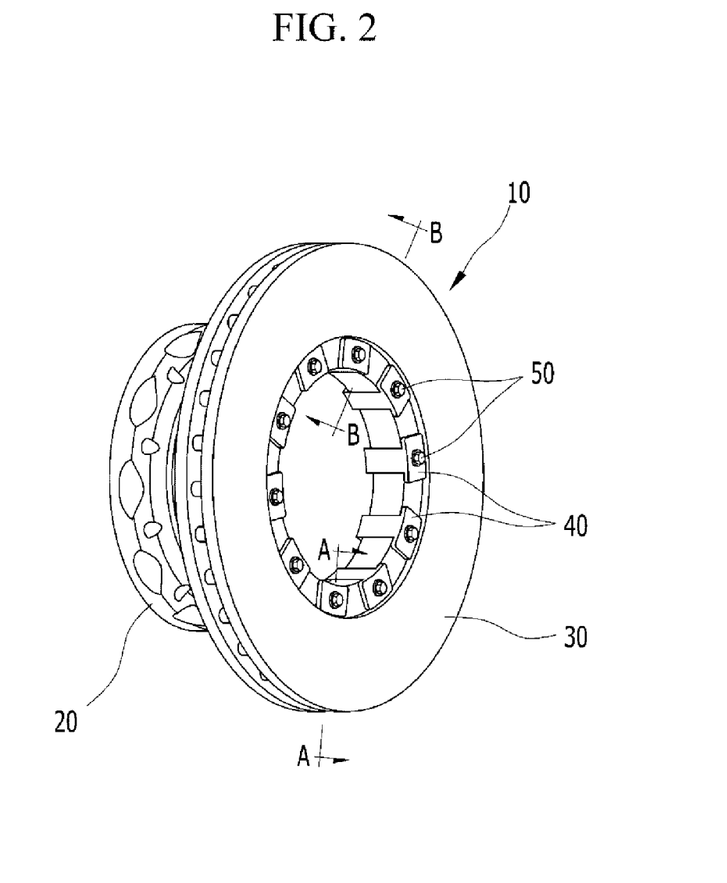
FIG. 2 is a perspective view of a disk rotor assembly for a vehicle according to an exemplary embodiment of the present invention.

FIG. 2 is a perspective view of a disk rotor assembly for a vehicle according to an exemplary embodiment of the present invention.

As shown in FIG. 2, the disk rotor assembly 10 for a vehicle according to an exemplary embodiment of the present invention is assembled by engaging the adaptor 20, the disk rotor 30, and the transmitter 40 through the engaging member 50.

Hereinafter, constituent elements of the disk rotor assembly 10 according to an exemplary embodiment of the present invention will be described in detail with reference to FIG. 3 to FIG. 5.

Figure 3:
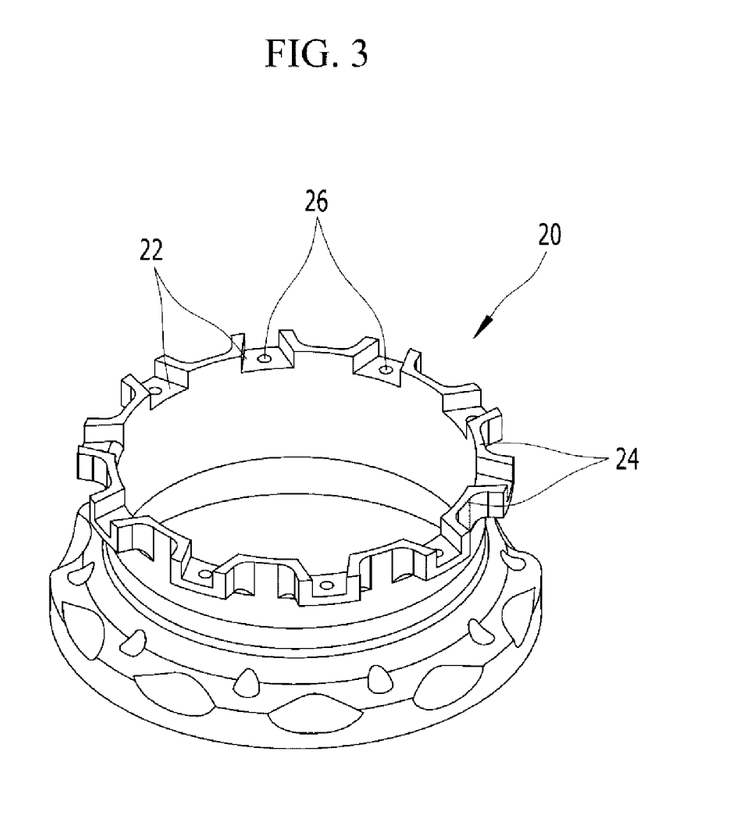
FIG. 3 is a perspective view of an adaptor according to an exemplary embodiment of the present invention.

FIG. 3 is a perspective view of an adaptor according to an exemplary embodiment of the present invention.

As shown in FIG. 3, a transmitter mounting surface 22, a rotor contacting surface 24, and an engaging hole 26 are formed at the adaptor 20.

The adaptor 20 has a hollow cylindrical shape. One circular side surface between two circular side surfaces of the adaptor 20 is connected to the disk rotor 30. In addition, the transmitter mounting surface 22, the rotor contacting surface 24, and the engaging hole 26 are formed at the circular side surface of the adaptor 20 connected to the disk rotor 30.

A plurality of rotor contacting surfaces 24 is formed radially at the circular side surface of the adaptor 20 connected to the disk rotor 30 along an external circumference thereof. The rotor contacting surface 24 is open to a radial outward direction.

A plurality of transmitter mounting surfaces 22 is formed radially at the circular side surface of the adaptor 20 connected to the disk rotor 30 along the external circumference thereof. In addition, a plurality of transmitter mounting surfaces 22 are formed between the neighboring rotor contacting surfaces 24. That is, the transmitter mounting surface 22 and the rotor contacting surface 24 are alternately arranged along the external circumference of the circular side surface of the adaptor 20. In addition, the transmitter mounting surface 22 has a concave shape from the circular side surface of the adaptor 20 in an axial direction. The transmitter mounting surface 22 is open in the axial direction and the radial direction. An exterior circumference of the transmitter mounting surface 22 is shorter than an interior circumference thereof. The transmitter mounting surface 22 contacts with a side surface of the transmitter.

The engaging hole 26 is formed at the transmitter mounting surface 22. At least one of engaging holes 26 is formed at one transmitter mounting surface 22. If the engaging member 50 is a bolt, a screw thread is formed at an interior circumference of the engaging hole 26.

Since the adaptor 20 is hollow, the adapter 20 can be mounted on a hub of the wheel. Engagement of the adaptor 20 and the wheel is well known to a person skilled in the art, and thus detailed description thereof will be omitted.

Figure 4:
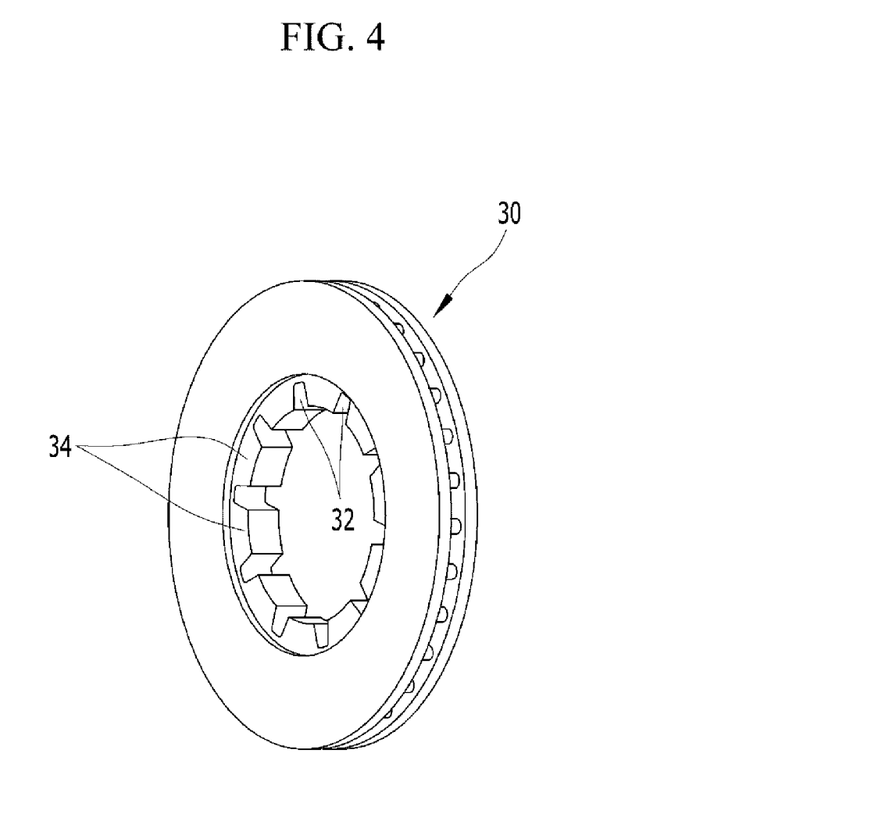
FIG. 4 is a perspective view of a disk rotor according to an exemplary embodiment of the present invention.

FIG. 4 is a perspective view of a disk rotor according to an exemplary embodiment of the present invention.

As shown in FIG. 4, a transmitter mounting groove 32 and an adaptor contacting surface 34 are formed at the disk rotor 30.

The disk rotor 30 has a hollow disk shape. Therefore, the disk rotor 30 includes an exterior circumference and an interior circumference. In addition, the transmitter mounting groove 32 and the adaptor contacting surface 34 are formed at an interior circumference of the disk rotor 30.

A plurality of transmitter mounting grooves 32 are formed at the interior circumference of the disk rotor 30. The transmitter mounting groove 32 corresponds to the transmitter mounting surface 22 of the adaptor 20. In addition, the transmitter mounting groove 32 is open in the axial direction such that the transmitter 40 penetrates through the transmitter mounting groove 32 and contacts with the transmitter mounting surface 22.

A plurality of adaptor contacting surfaces 34 is formed at the interior circumference of the disk rotor 30. The adaptor contacting surface 34 is protruded radially inwardly from the interior circumference of the disk rotor 30. In addition, the adaptor contacting surface 34 is formed between the neighboring transmitter mounting grooves 32. That is, the adaptor contacting surface 34 and the transmitter mounting groove 32 are alternately formed. Further, the adaptor contacting surface 34 corresponds to the rotor contacting surface 24.

Figure 5A:
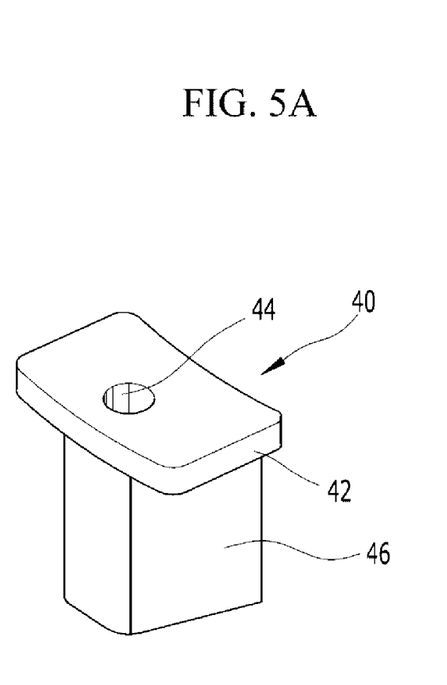
FIG. 5 is a perspective view of a transmitter according to an exemplary embodiment of the present invention.
Figure 5B:
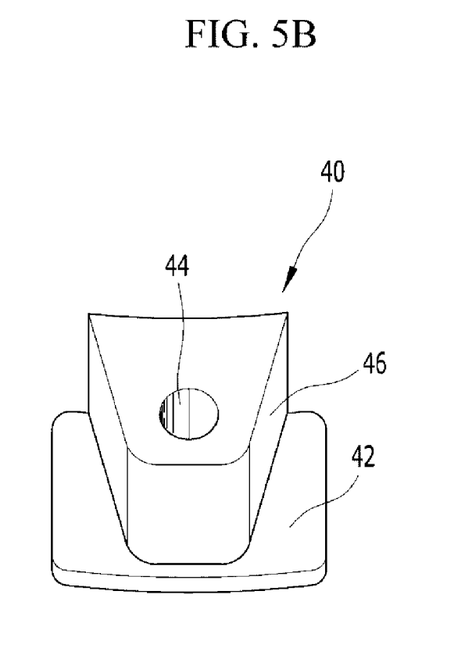

FIG. 5 is a perspective view of a transmitter according to an exemplary embodiment of the present invention.

As shown in FIG. 5, the transmitter 40 includes a bracket 42, a penetration hole 44, and a column 46. The transmitter 40 is engaged with the adaptor 20 by the engaging member 50, and restricts a movement of the disk rotor 30 so as to form the disk rotor assembly 10.

As shown in FIG. 5, a cross-sectional shape of the column 46 is trapezoid, but is not limited to this. The cross-sectional shape of the column 46 corresponds to shapes of the transmitter mounting surface 22 and the transmitter mounting groove 32. The column 46 extends from a side surface of the bracket 42 to the axial direction. Therefore, a side surface of the transmitter 40 penetrates through the transmitter mounting groove 32 and contacts with the transmitter mounting surface 22, and the bracket 42 is formed at the other side surface of the transmitter 40.

The bracket 42 contacts with the other side surface of the disk rotor 30 so as to apply pressure to the disk rotor 30 toward the adaptor 20. Therefore, the disk rotor 30 and the adaptor 20 are engaged with each other by the transmitter 40. In addition, the bracket 42 prevents the disk rotor 30 from being disengaged from the adaptor 20.

The penetration hole 44 is formed axially at the transmitter 40. If the engaging member 50 is a bolt, a screw thread is formed at an interior circumference of the penetration hole 44 such that the bolt is engaged thereto.

The engaging member 50 penetrates through the penetration hole 44 formed at the transmitter 40 and engages to the engaging hole 26 formed at the adaptor 20 so as to engage the adaptor 20 with the transmitter 40. At this time, the column 46 of the transmitter 40 is mounted at the transmitter mounting groove 32. Therefore, the adaptor 20, disk rotor 30, and the transmitter 40 are engaged by the engaging member 50 so as to form the disk rotor assembly 10.

Figure 6:
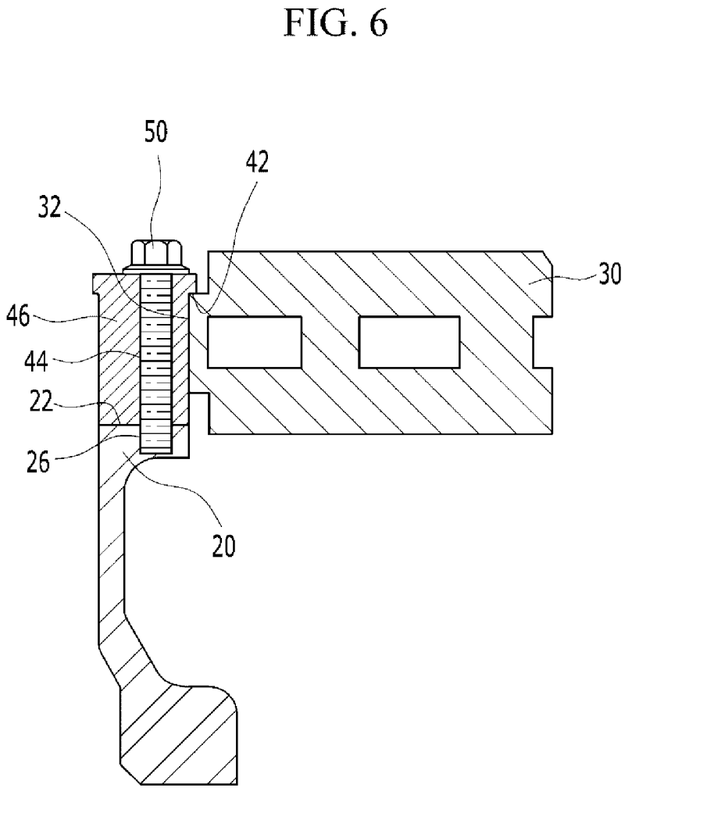
FIG. 6 is a cross-sectional view taken along the line A-A in FIG. 2.
Figure 7:
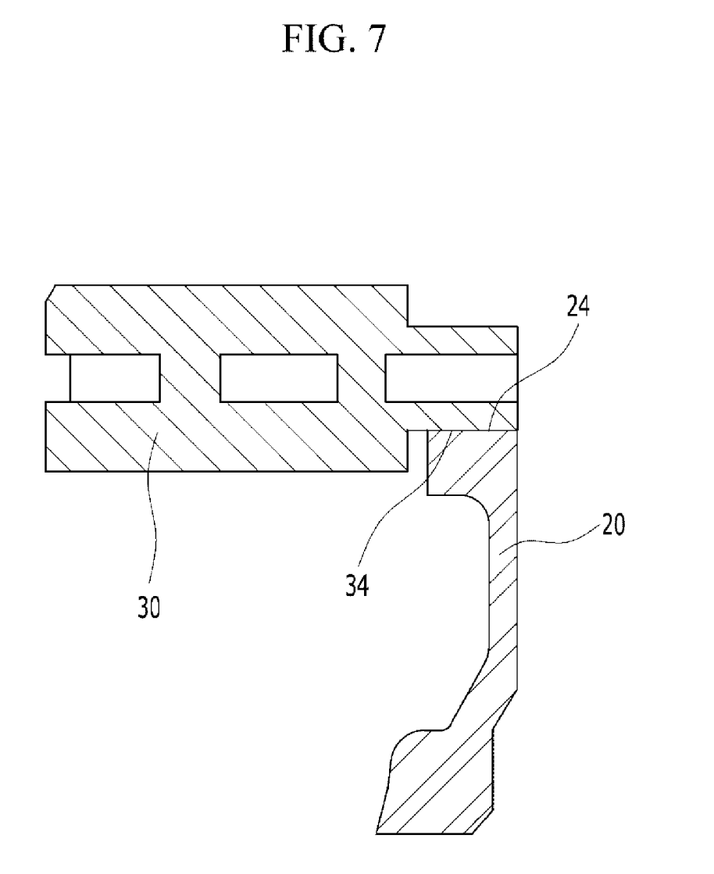
FIG. 7 is a cross-sectional view taken along the line B-B in FIG. 2.

Referring to FIG. 6 to FIG. 7, an engaging state of the disk rotor assembly for a vehicle according to an exemplary embodiment of the present invention will be described in detail.

FIG. 6 is a cross-sectional view taken along the line A-A in FIG. 2.

In a state that the disk rotor assembly 10 is engaged as shown in FIG. 6, the transmitter 40 is mounted at the transmitter mounting groove 32 of the disk rotor 30. In addition, the side surface of the transmitter 40 contacts with the transmitter mounting surface 22 of the adaptor 20, and the bracket 42 contacts with the other side surface of the disk rotor 30 so as to apply the pressure to the disk rotor 30 toward the adaptor 20.

At this time, the engaging member 50 is engaged simultaneously to the engaging hole 26 and the penetration hole 44. Therefore, the adaptor 20 and the disk rotor 30 are engaged by the transmitter 40 and the engaging member 50.

FIG. 7 is a cross-sectional view taken along the line B-B in FIG. 2.

In a state that the disk rotor assembly 10 is engaged as shown in FIG. 7, the rotor contacting surface 24 of the adaptor 20 contacts with the adaptor contacting surface 34 of the disk rotor 30. If the bracket 42 contacts with the other side surface of the disk rotor 30 and applies the pressure to the disk rotor 30 toward the adaptor 20, the rotor contacting surface 24 supports the adaptor contacting surface 34 and the disk rotor 30 is fixed to the adaptor 20.

In addition, since an entire contour of the rotor contacting surface 24 supports the adaptor contacting surface 34, a contact area between the rotor contacting surface 24 and the adaptor contacting surface 34 becomes large. Therefore, the adaptor 20 and the disk rotor 30 can be engaged with each other even though large load is not applied to the engaging member 50 and the transmitter 40.

Since the adaptor 20 and the disk rotor 30 are manufactured independently and are assembled by the transmitter 40 and the engaging member 50 instead of being integrally formed, the disk rotor 30 is not completely restricted by the adaptor 20 according to an exemplary embodiment of the present invention. Therefore, when heat deformation occurs at the disk rotor 30, the heat deformation may be absorbed by the disk rotor 30. Therefore, heat crack of the disk rotor 30 may be prevented and durability of the adaptor 20 and the disk rotor 30 may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise fauns disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A disk rotor assembly for a vehicle, comprising:
    an adaptor adapted to be mounted on a hub and to receive torque of a wheel;
    a disk rotor generating a braking force;
    a transmitter engaging the adaptor with the disk rotor and adapted to transmit the torque received by the adaptor to the disk rotor or to transmit the braking force generated by the disk rotor to the adaptor; and
    an engaging member for engaging the adaptor, the disk rotor, and the transmitter altogether;
    wherein the adaptor has a transmitter mounting surface contacting with a side surface of the transmitter, and rotor contacting surfaces contacting with the disk rotor; and
    wherein the disk rotor includes a transmitter mounting groove;
    wherein the rotor contacting surfaces of the adaptor extend into the transmitter mounting groove and the transmitter mounting surface of the adaptor is formed between the rotor contacting surfaces in the transmitter mounting groove; and wherein the transmitter penetrates the transmitter mounting groove and the side surface of the transmitter is engaged with the transmitter mounting surface.

2. The disk rotor assembly of claim 1, wherein the disk rotor further has:
an adaptor contacting surface contacting with the rotor contacting surfaces of the adaptor.

3. The disk rotor assembly of claim 2, wherein the transmitter mounting groove and the adaptor contacting surface are formed at an interior circumference of the disk rotor.

4. The disk rotor assembly of claim 3, wherein the transmitter mounting groove is formed at the interior circumference of the disk rotor along a circumferential direction, and the adaptor contacting surface is formed between neighboring transmitter mounting grooves.

5. The disk rotor assembly of claim 2, wherein the rotor contacting surface and the adaptor contacting surface contact with each other in a case that the adaptor and the disk rotor are engaged.

6. The disk rotor assembly of claim 2, wherein a bracket is formed at the transmitter so as to engage the adaptor with the adaptor contacting surface of the disk rotor and to prevent disengagement of the disk rotor.

7. The disk rotor assembly of claim 1, wherein a penetration hole through which the engaging member penetrates is formed at the transmitter, and an engaging hole for engaging with the engaging member is formed at the transmitter mounting surface.

8. The disk rotor assembly of claim 1, wherein the transmitter mounting surface is formed at an exterior circumference of the adaptor along a circumferential direction, and the rotor contacting surfaces are disposed between neighboring transmitter mounting surfaces.

9. The disk rotor assembly of claim 1, wherein the transmitter mounting surface has a concave shape in an axial direction and open in the axial direction and a radial direction of the adaptor.

10. The disk rotor assembly of claim 9, wherein an exterior circumference of the transmitter mounting surface is shorter than an interior circumference thereof.

11. The disk rotor assembly of claim 1, wherein the adaptor and the transmitter are directly engaged with each other by the engaging member, and the disk rotor is engaged to the adaptor by engagement of the adaptor and the transmitter.

12. The disk rotor assembly of claim 11, wherein a bracket is formed at the transmitter so as to engage the adaptor with the disk rotor and to prevent disengagement of the disk rotor.

* * * * *